July 25, 1967            F. SINGER            3,332,329

PHOTOGRAPHIC CAMERA

Filed Oct. 27, 1964            2 Sheets-Sheet 1

United States Patent Office 3,332,329
Patented July 25, 1967

3,332,329
PHOTOGRAPHIC CAMERA
Franz Singer, Munich, Germany, assignor to Compur-Werk Gesellschaft mit beschrankter Haftung & Co., Munich, Germany, a firm of Germany
Filed Oct. 27, 1964, Ser. No. 406,772
Claims priority, application Germany, Oct. 31, 1963, C 11,060
9 Claims. (Cl. 95—10)

ABSTRACT OF THE DISCLOSURE

A camera comprising an axially focusable lens structure, an exposure meter, and an exposure factor setting member movable axially with the focusing movements of the lens structure, is provided with a motion transmission assembly for transmitting setting movements of the setting member to the exposure meter mechanism without transmitting the axial movements of the setting member that occur when the lens is focused. In the embodiment disclosed, the motion transmission assembly comprises as part of the lens structure an integrating gear in combination with an axially displaceable pin which bears against one arm of a transversely pivoted bellcrank lever. The other arm of the lever bears against a slide surface, generally parallel to the optical axis, of a slide bar fixed against axial movement and rotatable in the camera housing on an axis parallel to the optical axis. The slide bar has another surface facing in a direction opposite to that of the slide surface, which is in contact with a lateral arm on a transverse coupling shaft connected either to a gear that turns the entire exposure meter housing or to a follow-up pointer in the exposure meter mechanism. Spring means maintains contact between these various members of the motion transmission assembly. Only movement of the integrating gear causes the pin to be axially displaced and pivot the bellcrank lever. This results in a corresponding rotation of the slide bar thereby to cause the coupling shaft arm to turn. When exposure correction for bellows extension effect is desired, the slide surface of the slide bar is at an appropriate slight angle to the optical axis; when no such correction is desired, the slide surface is parallel to the optical axis.

---

This invention relates to a photographic camera, and more particularly to a camera in which the lens is mounted for axial focusing movement, and in which there is a photo-electric exposure meter and at least one settable or adjustable member, movable to adjust an exposure factor and also movable axially with the focusing movements of the lens, and in which the movable adjusting or setting member acts upon the exposure meter or upon a follow-up member associated therewith.

An object of the invention is the provision of a generally improved and more satisfactory camera of this kind.

Another object is the provision of a camera having a particularly simple, effective, and relatively inexpensive construction for transmitting the movements of the exposure factor setting member to the exposure meter mechanism, notwithstanding the axial movements to which the exposure factor setting member is subjected when the lens is focused.

Still another object is the provision of transmission means for transmitting the adjusting movement of an exposure factor adjusting member to the exposure meter assembly in such a way as to compensate for or take account of the greater exposure needed when the camera is focused upon a relatively near object, this being sometimes called the bellows extension effect.

These and other desirable objects may be attained in the manner disclosed as an illustrative embodiment of the invention in the following description and in the accompanying drawings forming a part hereof, in which.

Figure 1:
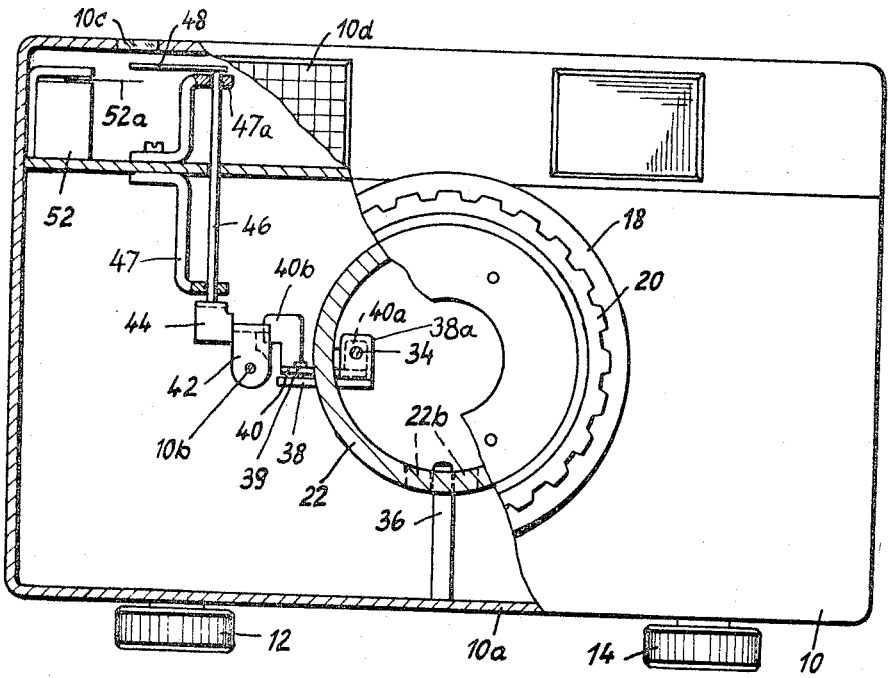
FIG. 1 is a front elevational view, with parts broken away and parts in vertical section, of a camera according to a preferred embodiment of the present invention.

Referring now to the drawings, the camera comprises a body portion indicated in general at 10, having a bottom wall 10a. The camera is, in general, of known construction, and many of the conventional parts are omitted from the drawings and description, being well understood in the art and not necessary to an understanding of the present invention. The camera has the usual conventional film winding knob 12, and rewinding knob 14, and a trip or trigger 16 to initiate operation of the shutter to make an exposure.

Suitably secured to the front wall of the camera, as by means of screws (not shown) is a mounting member 18, centrally apertured concentrically with the optical axis and internally screw threaded. A focusing ring 20, likewise concentric with the optical axis, has a focus distance scale 20a marked circumferentially on its periphery, and has external screw threads 20b engaging the screw threads of the member 18, and internal screw threads 20c engaging external screw threads on the objective mounting tube 22. The screw threads 20b and 20c are of opposite hand or direction, for example the thread 20b being a right hand thread and the thread 20c a left-hand thread, so that rotation of the focusing ring 20 will move the objective mounting ring 22 axially forwardly or rearwardly, to carry bodily with it the objective or lens assembly of conventional kind (not shown) as well as the shutter assembly indicated in general at 26 and secured to the front of the tube 22 as by means of screws 24. To prevent the tube 22 from turning when the focusing ring 20 is turned, and thus insure the correct axial movement of the tube 22, there is a suitable pin and slot arrangement. For example, the tube has an axial slot 22a formed between two rearwardly extending arms 22b, and engaged in the slot is a stationary pin 36 mounted on the bottom wall 10a of the camera.

On the objective shutter 26, of known construction, there are one or more exposure factor setting members mounted for rotation about the optical axis which passes centrally through the shutter; for example, a shutter speed setting ring 28 bearing a shutter speed scale 28a marked circumferentially on its periphery, and a diaphragm aperture setting ring 30 bearing a diaphragm aperture or f number scale 30a marked circumferentially on its periphery. Both of these scales, like the focus distance scale 20a, are read in conjunction with a fixed reference point or index mark 26a marked on the stationary part of the periphery of the shutter 26. When referring to the shutter as stationary, this means stationary in a rotational sense, since the entire shutter does move axially forwardly and rearwardly, along with the lens components (not shown) when the focusing ring 20 is turned.

Figure 3:
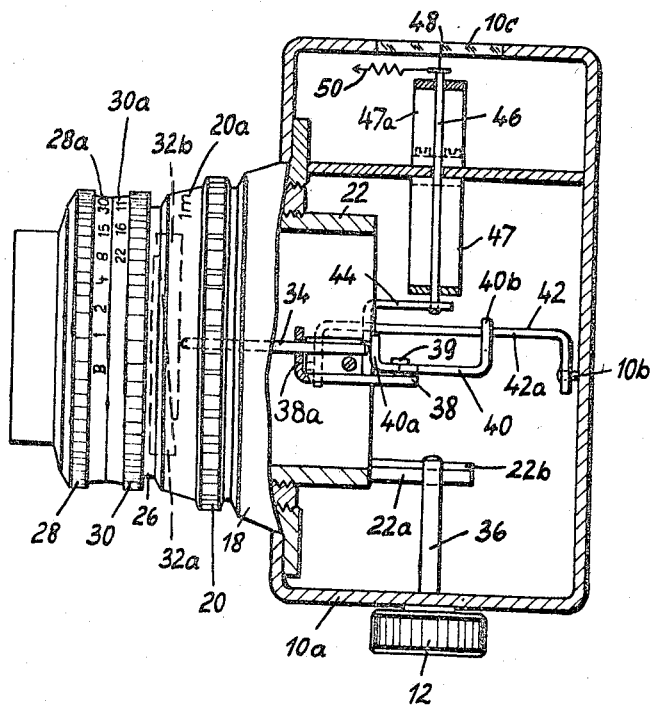
FIG. 3 is a view partly in side elevation and partly in axial vertical section of the camera, many parts being likewise omitted in this view.

The shutter 26 is provided with what may be called an integrating gear or key differential of known form which provides a rearwardly faced surface axially displaceable in accordance with the rotary adjusting movements of the exposure factor setting rings 28 and 30, and more particularly in accordance with the positions of relative orientation of these two rings with respect to each other. This integrating gear or key differential is schematically shown in FIG. 3 by the two wedge members 32a and 32b. One form of such integrating gear is disclosed in German Gebrauchsmuster 1,780,469; other forms are disclosed in United States Patents 3,086,432 and 3,089,397. The rearward face of the second key or wedge 32b of the integrating gear engages the front end of a displaceable pin 34, extending rearwardly parallel to the optical axis, so that the longitudinal position of this pin (with relation to the shutter 26) depends upon the positions of relative orientation of the exposure setting members 28 and 30 with respect to each other, since it is this position of relative orientation which controls the location, in an axial direction, of the rear face of the second key member 32b.

Mounted on the tube 22, to move bodily therewith, is a bracket 38 carrying pivot pin 39 on which is pivoted a two-armed bellcrank lever 40. An upstanding ear 38a is apertured to provide a guide for the rod or pin 34. One arm 40a of the bellcrank ever 40 engages the rear end of the pin 34, and the other arm 40b engages against an operating surface 42a of a slide bar 42 freely suspended for rotation on a rotary axis parallel to the optical axis along which the tube 22 moves forwardly and rearwardly. The axis of rotation of the bar 42 is conveniently provided by pins 10b on downturned ears at the front and rear ends of the bar 42, as shown in FIG. 2.

The second edge 42b of the swingable bar 42, that is, the edge opposite to the edge 42a, is engaged with a lever 44 which is fixed to the lower end of a coupling spindle or shaft 46 extending vertically through bearing openings in stationary bracket parts 47 and 47a as seen especially in FIGS. 1 and 3. This shaft or spindle is operatively connected to any suitable part of the exposure meter mechanism. For example, it can be operatively connected to a gear which turns the entire exposure meter housing, so that by turning the shaft 46 the pointer of the exposure meter can be brought to a predetermined reference point; or, on the other hand, the exposure meter housing itself can be stationary, and the shaft 46 can be operatively connected to what is known in the art as a follow-up pointer, so that turning the shaft 46 can bring the follow-up pointer of the exposure meter mechanism into alinement with the position of the exposure meter pointer itself. Both arrangements (that is, one in which the entire exposure meter housing is turned, and one in which the exposure meter housing is stationary and a follow-up pointer is used) are conventional per se and well understood by those skilled in the art. In the example of the invention as here illustrated, there is a follow-up pointer 48 fixed to the upper end of the shaft 46, and in operation of the device the shaft is turned to bring the pointer 48 into alinement with the pointer 52a of the stationary exposure meter 52, the relationship of the two pointers 48 and 52a to each other being observable through a window 10c in the top wall of the camera body. There is, of course, the usual photo-electric cell located behind a grid window 10d in the camera body, the photo-cell being electrically connected in the conventional manner to the moving coil within the exposure meter housing 52, as readily understood in the art, so that the position of the pointer 52a depends at least in part upon the factor of brightness of light falling upon the photo-cell, and upon such other factors (e.g., film speed factor and filter factor) as may be fed into the exposure meter assembly in well known manner.

Figure 2:
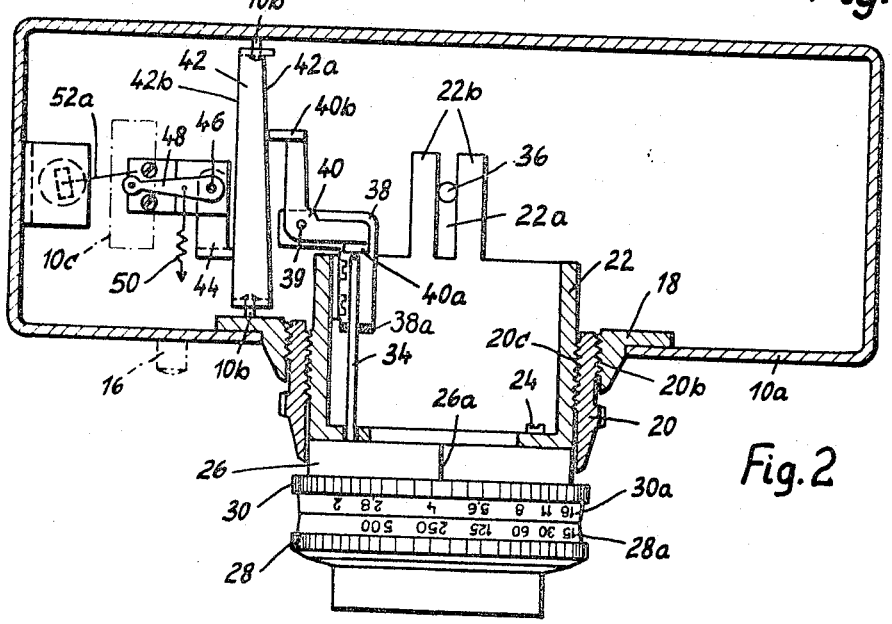
FIG. 2 is a view of the camera partly in horizontal section and partly in plan, many parts not necessary to an understanding of the invention being omitted.

An orienting or biasing spring 50 tends to turn the follow-up pointer 48 and its shaft 46 in a counterclockwise direction when viewed from above as in FIG. 2, thereby keeping the end of the lever 44 pressed lightly against the edge 42b of the bar 42, this pressure in turn tending to swing the bar 42 on its pivots 10b to keep the other edge 42a pressed against the end 40b of the bellcrank lever 40, and this pressure in turn tends to turn the bellcrank 40 in a clockwise direction when viewed from above, thereby pressing the other arm 40a of the bellcrank against the rear end of the transmission pin 34 to keep the front end of the transmission pin engaged lightly but snugly with the integrating gear 32b.

From what has been said above, it will be apparent that as the tube 22 and shutter 26 move axially forwardly and rearwardly for focusing purposes (when the focus adjusting ring 20 is turned) the parts 34, 38, and 40 will move bodily with them, and the end 40b of the lever 40 will slide along the surface 42a of the bar 42. If it is not desired to provide an exposure correction for the "bellows extension effect" or "close-up focusing effect," the surface or edge 42a of the bar 42 can be made parallel to the optical axis and parallel to the surface or edge 42b, so that the bellcrank lever 40 will not cause any swinging of the bar 42b during the forward or backward focusing movement, so long as the transmission pin 34 remains bodily stationary with respect to the parts 22 and 26. But it is usually preferred to provide a correction for the bellows extension effect, and for this purpose the edge 42a of the bar 42 is preferably made in the nature of a cam, at an angle to the optical axis and to the opposite edge 42b, as illustrated in FIG. 2. With such an angular or cam-like construction, it is seen that forward and backward focusing movements of the tube 22 and shutter 26 will cause the arm 40b to swing the bar 42 (assuming that the parts 34 and 40 remain stationary relative to the parts 22 and 26) and thus will introduce into the mechanism the necessary correction of the exposure factor on account of the lens being moved farther away from or closer to the focal plane of the sensitized film.

The operation is as follows:

When the user wishes to take a photograph, he sets the shutter speed and diaphragm aperture by turning the rings 28 and 30, respectively, to the desired values relative to each other, and this causes the integrating gear parts 32a and 32b to cooperate with each other to push the transmission pin 34 farther rearwardly or to allow it to move farther forwardly (under the influence of the spring 50) as the case may be. The longitudinal motion of the pin 34 is transmitted through the bellcrank lever 40 to the swingnng bar 42, and from the swinging bar 42 to the lever 44 and shaft 46, thereby feeding the exposure factor setting into the exposure meter mechanism or assembly. If the exposure meter assembly is of the type in which the exposure meter housing is turned by the shaft 46, the operator will observe the needle or pointer of the exposure meter and see whether it is alined with the proper reference mark, and if not, he will turn either the shutter speed ring 28 or the diaphragm aperture ring 30 to a new position, to change the exposure factor until the pointer is brought to the proper position. If the exposure meter assembly is of the type employing a follow-up pointer, he will observe whether the follow-up pointer is in the desired relationship to the pointer of the meter, and if not, he will change either the shutter speed setting or the diaphragm aperture setting until the pointers are in the desired relation to each other.

When the diaphragm aperture and shutter speed have been set to such positions relative to each other as to produce the desired exposure factor, both rings 28 and 30 may be turned simultaneously in the same direction and to the same extent, without altering the exposure factor, and thus the operator may easily and quickly select a slower shutter speed with a correspondingly smaller aperture, or a faster shutter speed with a correspondingly larger aperture, if desired. Such simultaneous rotation of the two rings 28 and 30 will cause no change in the relationship of the integrating gear parts 32a and 32b to each other and thus will not affect the longitudinal position of the pin 34.

If it is desired to focus the camera for a nearer or farther distance, the focusing ring 20 is turned, and this produces bodily forward or rearward movement, as the case may be, of the tube 22 and shutter 26 and the lens contained therein. This does not move the members 34 and 40 relative to the tube 22 and shutter 26, but does move them axially relative to the camera body and the swinging slide bar 42 therein. If the edge 42a of the bar 42 is made of cam formation as in the preferred form above described, the axial forward or rearward movement of the bellcrank 40, acting upon the edge 42a, will cause turning of the bar 42 on its pivots 10b, thereby feeding into the exposure meter assembly the further factor of change of exposure value because of the increased or decreased distance of the lens from the focal plane of the film. This focusing movement may bring the exposure meter pointer (or follow-up pointer, as the case may be) to a new position which is no longer in the proper relation to the reference mark or to the other pointer, as the case may be, and so may require a change in the setting of the shutter speed or diaphragm aperture, to bring the pointer back to the correct position.

From the above description, it will be apparent that the present construction is applicable to cameras in which there is no axial focusing movement of the shutter, and is especially advantageous with cameras in which there is such focusing movement, not only because the construction enables a focus correction factor to be introduced automatically into the exposure evaluating system during the focusing operation, but also because it enables the delicate and sensitive parts of the exposure meter mechanism to be mounted stationarily on the camera body itself, but nevertheless to be controlled in an easy and simple manner from the parts which move forwardly and backwardly during focusing of the camera.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a body, an exposure meter assembly mounted in said body, a shutter assembly mounted for axial movement relative to said body for focusing, said shutter assembly including at least one setting member movable for adjusting an exposure factor, and transmission mechanism for transmitting movement from said setting member to said meter assembly, said transmission mechanism including a first member movable bodily with said shutter assembly during focusing movements thereof, and also movable relative to said shutter assembly in response to adjusting movement of said setting member, and a second member movably mounted in said body and having a face extending in a direction approximately parallel to the direction of focusing movement of said shutter assembly, said first member being operatively engaged with and sliding along said face of said second member during said focusing movement, the members being so arranged that movement of said first member in response to adjusting movement of said setting member will cause movement of said second member, said transmission mechanism also including an operative connection from said second member to said exposure meter assembly.

2. A construction as defined in claim 1, characterized by the fact said first member is in the form of a bellcrank lever pivotally mounted on a pivot pin disposed transversely to said direction of focusing movement.

3. A construction as defined in claim 1, further including a supporting mount for supporting said shutter assembly and movable therewith in the direction of an optical axis for focusing, said first member of said transmission mechanism being in the form of a bellcrank lever pivotally mounted on said supporting mount for oscillation on a pivot pin extending transversely of said optical axis.

4. A construction as defined in claim 1, further including a supporting mount for supporting said shutter assembly and movable therewith in the direction of an optical axis for focusing, said shutter assembly including a shutter speed setting member and a diaphragm aperture setting member, said transmission mechanism including a transmission pin mounted on said supporting mount for axial movement thereon in a direction parallel to said optical axis under the joint influence of said speed setting member and said aperture setting member, said first member of said transmission mechanism being in the form of a bellcrank lever having one arm engaging said transmission pin and a second arm engaging said face of said second member and sliding along said face when said shutter assembly and said supporting mount are moved along said optical axis for focusing.

5. A construction as defined in claim 1, in which said second member of said transmission mechanism is in the form of a bail-like bar swingable on an axis parallel to said optical axis.

6. A construction as defined in claim 1, in which said face of said second member is in non-parallel relation to said direction of focusing movement, to act as a cam for introducing into said exposure meter assembly an adjustment responsive to focusing movement of said shutter assembly and first member.

7. A photographic camera comprising a body, an exposure meter assembly mounted in said body, a shutter assembly mounted for axial movement relative to said body for focusing, said shutter assembly including at least one setting member movable for adjusting an exposure factor, and transmission mechanism for transmitting movement from said setting member to said meter assembly, said transmission mechanism including a first member movable bodily with said shutter assembly during focusing movements thereof, and also movable relative to said shutter assembly in response to adjusting movement of said setting member, and a second member mounted in said body for movement in a direction transverse to the direction of focusing movement of said shutter assembly and held against movement in a direction parallel to said focusing movement, said second member having a face extending in a direction approximately parallel to said focusing movement, said first member being operatively engaged with said face and sliding along said face during said focusing movement, the members being so arranged that movement of said first member in response to adjusting movement of said setting member will cause movement of said second member in said transverse direction, said transmission mechanism also including an operative connection responsive to said transverse movement of said second member for moving said exposure meter assembly.

8. A construction as defined in claim 7, in which said face of said second member is in non-parallel relation to said direction of focusing movement, to act as a cam for introducing into said exposure meter assembly an adjustment responsive to focusing movement of said shutter assembly and first member.

9. A construction as defined in claim 7, in which said exposure meter assembly includes a follow-up pointer, and in which said follow-up pointer is the part of said exposure meter assembly which is operatively connected to and moved by said second member.

No references cited.

NORTON ANSHER, *Primary Examiner.*

J. F. PETERS, *Assistant Examiner.*